United States Patent [19]

Schultenkämper

[11] 4,130,325
[45] Dec. 19, 1978

[54] THRUST PLATE FOR THE BEARING PINS OF A TRUNNION IN A UNIVERSAL JOINT

[75] Inventor: Josef Schultenkämper, Essen, Fed. Rep. of Germany

[73] Assignee: Gelenkwellenbau GmbH, Essen, Fed. Rep. of Germany

[21] Appl. No.: 747,477

[22] Filed: Dec. 6, 1976

[30] Foreign Application Priority Data

Dec. 11, 1975 [DE] Fed. Rep. of Germany ....... 2555667

[51] Int. Cl.² .................. F16C 17/00; F16D 3/38
[52] U.S. Cl. .................................. 308/163; 64/17 A; 308/172; 308/DIG. 8
[58] Field of Search ............... 308/135, 139 A, 139 R, 308/160, 163, 164, 168, 165, 172, 237 R, 237 A, 238, DIG. 2, DIG. 8, 212; 64/13, 17 A, 17 R

[56] References Cited

U.S. PATENT DOCUMENTS

| 2,362,667 | 11/1944 | Schmidt | 308/160 |
| 3,070,980 | 1/1963 | Slaght | 64/17 A |
| 3,786,289 | 1/1974 | Baclawski et al. | 308/163 X |
| 3,891,282 | 6/1975 | Tuffias | 308/160 X |

FOREIGN PATENT DOCUMENTS 1290006  9/1972  United Kingdom .................. 64/17 A Primary Examiner—Trygve M. Blix
Assistant Examiner—Douglas C. Butler
Attorney, Agent, or Firm—Edmund M. Jaskiewicz

[57] ABSTRACT

A thrust plate utilized between the end face of a bearing pin of a trunnion in a universal joint and the bottom wall of a bushing on the bearing pin is formed of a wear-resistant heat-stable plastic material and lubricant grooves are formed in at least one surface of the plate. A plurality of protuberances which may be in the form of honeycombs, cams, or cam-ridges are formed in a surface of the plate between the lubricant grooves and occupy an area such that the deformation resistance under compression load will be less than two-thirds of the corresponding resistance value for the plate.

6 Claims, 20 Drawing Figures

FIG. 5
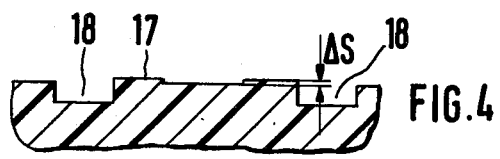
FIG. 4
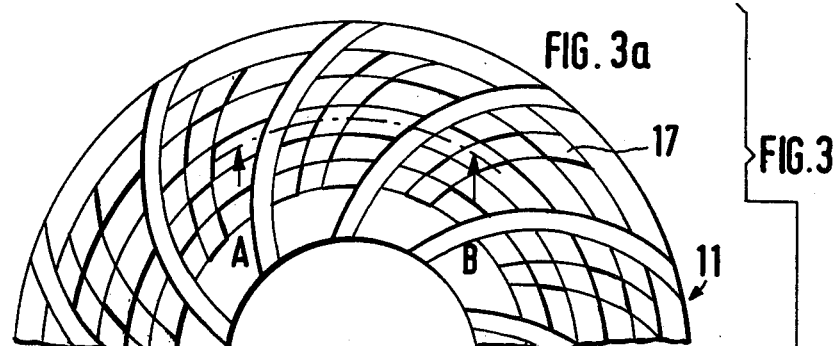
FIG. 3a
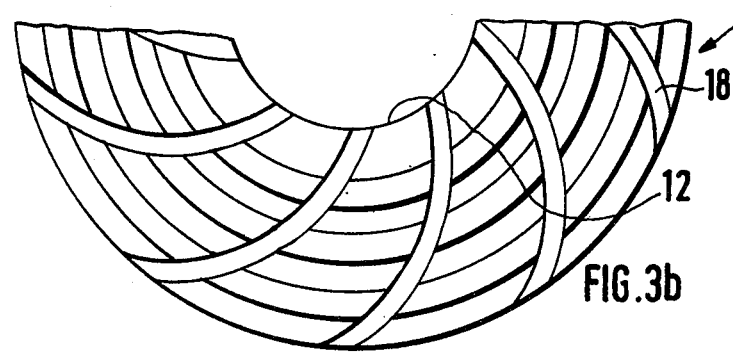
FIG. 3b
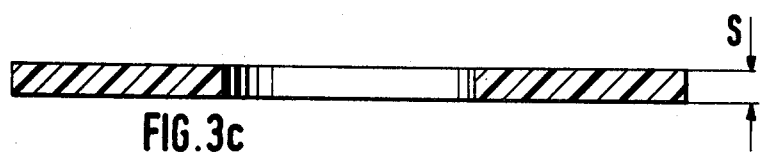
FIG. 3c
FIG. 3

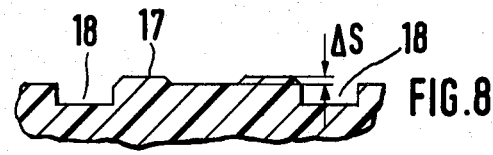
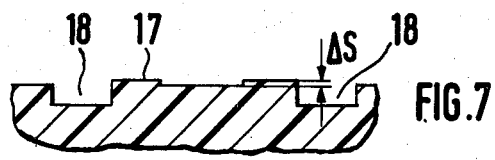
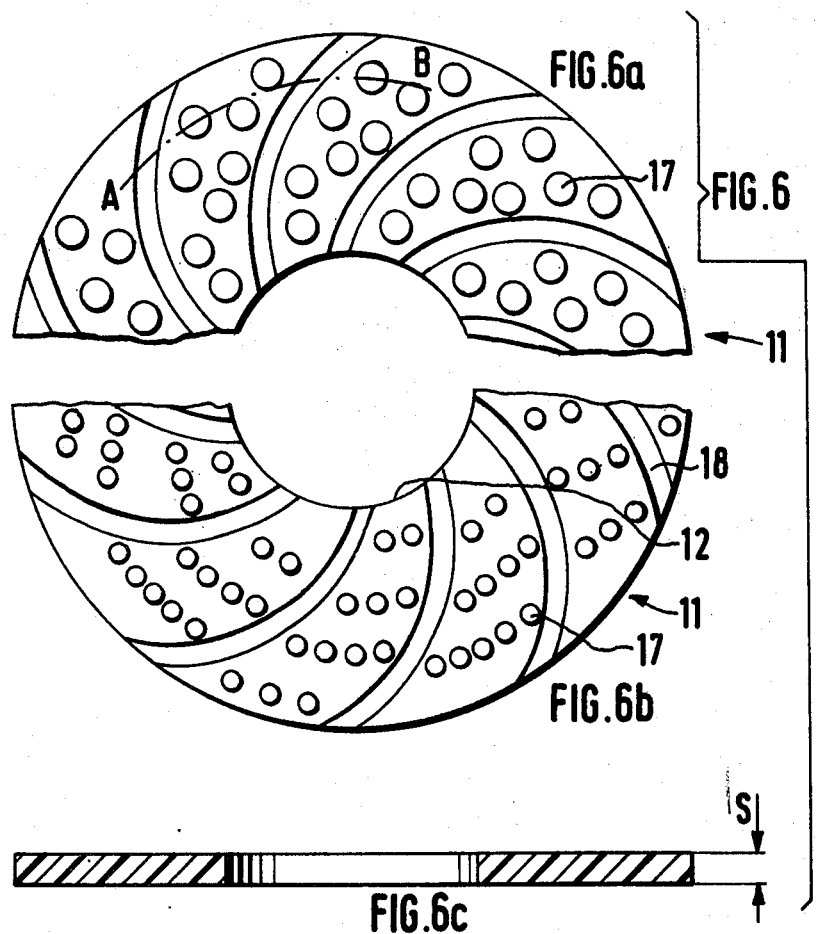

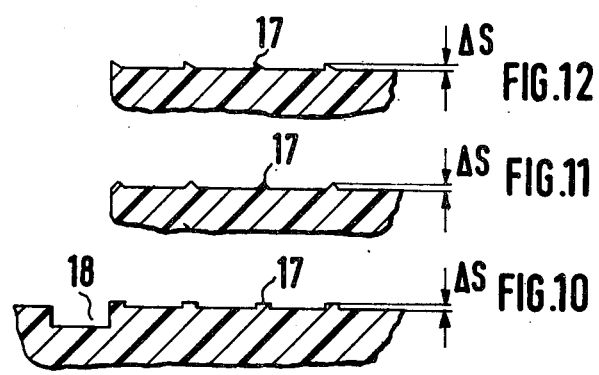
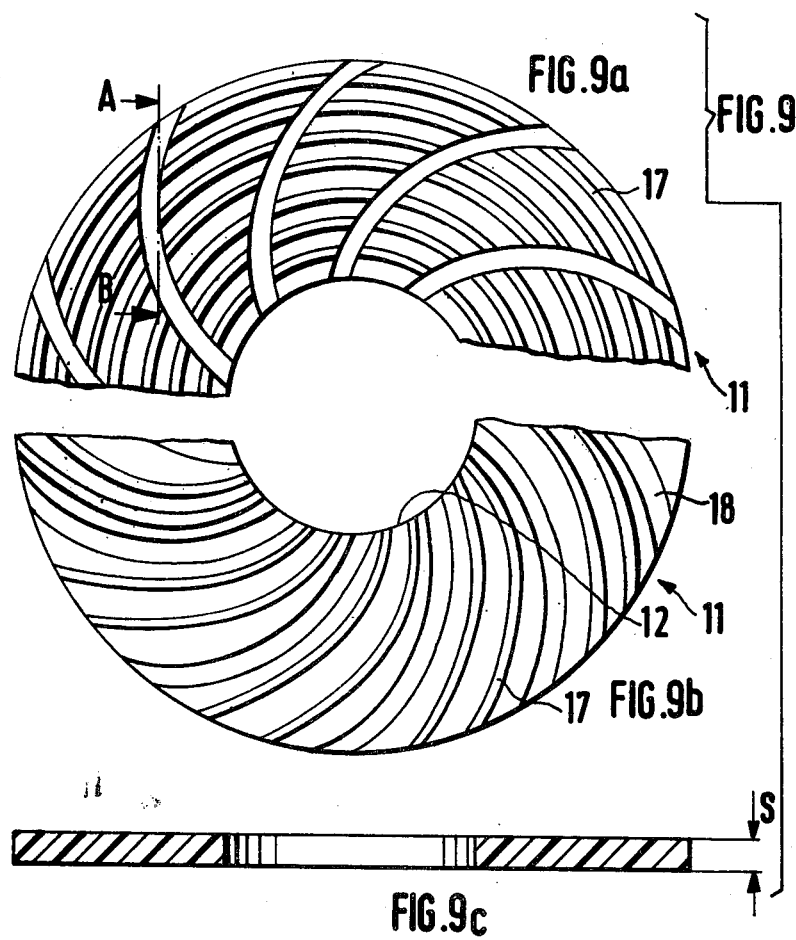

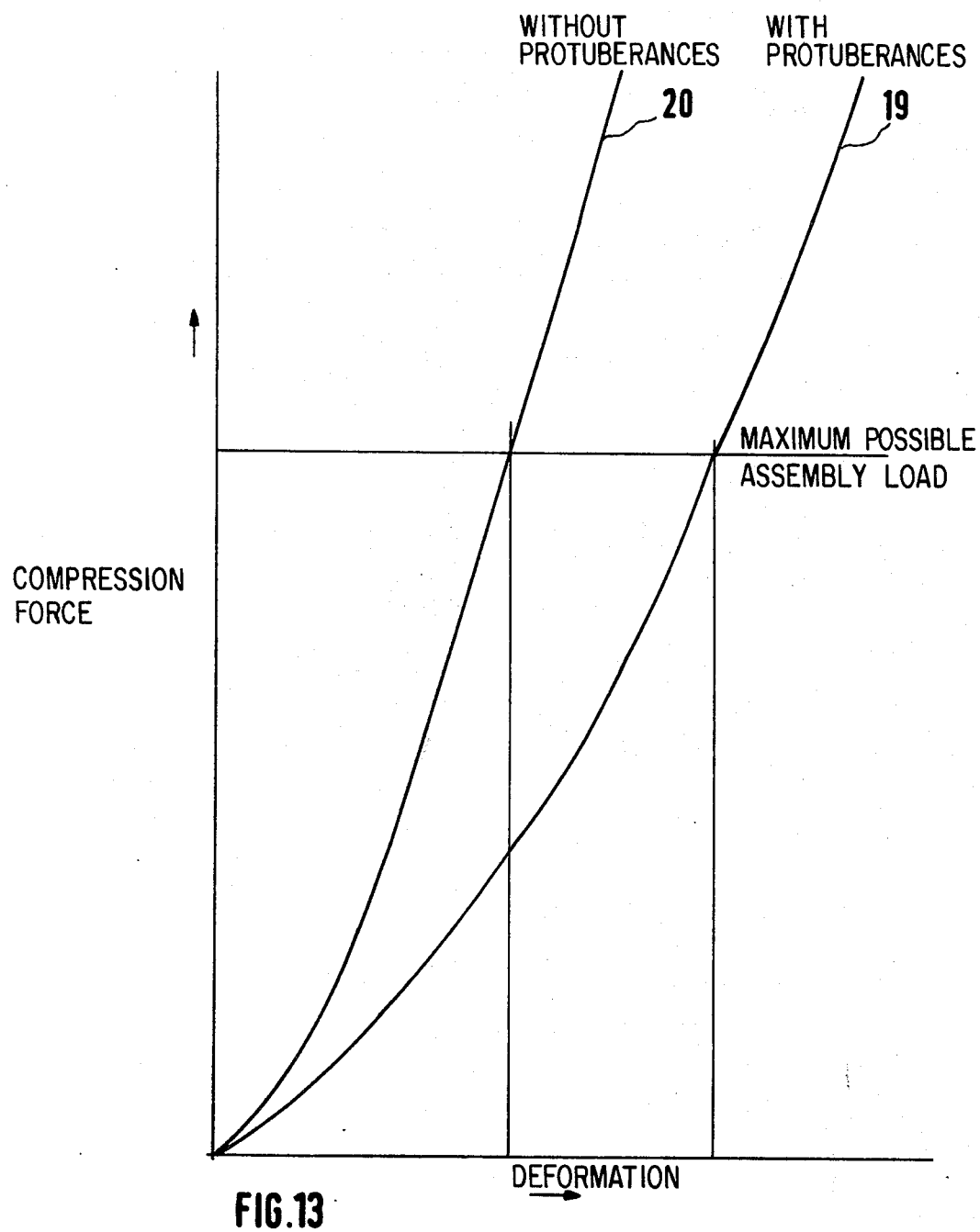

THRUST PLATE FOR THE BEARING PINS OF A TRUNNION IN A UNIVERSAL JOINT

The present invention relates to a thrust plate for positioning between the end face of a bearing pin of a trunnion in a universal joint and the bottom wall of a bushing on the bearing pin, more particularly, to such a thrust plate which enables optimum clearance to be automatically established after assembly of the joint.

In a universal joint, thrust plates have been provided between the end face of a bearing pin of a trunnion and the bottom wall of a bushing on the bearing pin. Such a thrust plate generally consists of a wear-resistant heat-resistant synthetic plastic material with lubricant grooves or channels being formed in at least one surface of the plate.

Such known thrust plates have the disadvantage of requiring considerable attention and care during assembly of the universal joint in order to establish the proper end clearance between the trunnion pin and the end wall of the bearing bushing. The bearing bushing is generally fixed in the yoke of the joint by a spring ring inserted into an annular groove formed in the yoke. The correct amount of play or clearance between the end of the trunnion pin and the bottom wall of the bearing bushing is generally achieved by using a proper combination of spring rings which are graduated by several 1/100 mm. It is apparent that this procedure requires a large inventory of spring rings of varying thicknesses. In addition, if the preapplied stress between the bushing and the trunnion pin is too great, the thrust plate will heat to such a degrees as to become plastically deformed. This will produce insufficient clearance and cause imbalances in the joint which will eventually cause failure of the joint because of obstruction of the lubricant channels.

It has also been proposed to position the bearing bushings by means of resilient counter or thrust plates. However, this arrangement had the disadvantage that the trunnion will not be maintained in a constant position so that radial forces caused by secondary momentum when the joint is bent at an angle or centrifugal loads arise because of imbalances cannot be absorbed. The thrust plate will contract resiliently and the additional displacement of the trunnion will create further imbalances which will cause vibrations and noise during operation.

It is therefore a principal object of the present invention to provide an improved thrust plate for positioning between the end face of a bearing pin of a trunnion in a universal joint and the bottom wall of a bushing which will facilitate and simplify assembly of the universal joint.

It is another object of the present invention to provide such a thrust plate which achieves optimum clearance at the ends of the trunnion bearing pins while using spring rings having a much coarser thickness gradation.

The present invention essentially comprises providing protuberances in the surfaces of the thrust plate which protuberances are positioned between the lubricant channels or grooves.

According to one aspect of the present invention a thrust plate for positioning between the end face of a bearing pin of a trunnion in a universal joint and the bottom wall of a bushing on the bearing pin may comprise a plate of a wear-resistant heat-stable plastic material having a plurality of lubricant grooves in a surface of the plate. Raised surface portions are provided on a surface of the plate between the lubricant grooves.

The raised surface portions may comprise a plurality of protuberances on one or both sides of the plate and the protuberances may comprise a honeycomb, cam or cam-ridges.

Other objects and advantages of the present invention will be apparent upon reference to the accompanying description when taken in conjunction with the following drawings, which are exemplary, wherein;

FIG. 3 shows an embodiment of the thrust plate of the present invention and FIG. 3a is a plan view of a portion of one surface of a thrust plate, FIG. 3b is a plan view of a portion of another surface of the thrust plate and FIG. 3c is a transverse sectional view through the thrust plate of FIGS. 3a and 3b;

FIG. 4 is a sectional view taken along the line A-B of FIG. 3a;

FIG. 5 is a sectional view similar to that of FIG. 4 but showing chamfered protuberances;

FIG. 6 (FIGS. 6a, 6b, 6c) are views similar to those of FIG. 3 but of a modification thereof;

FIGS. 7 and 8 are sectional views taken along the line A-B of FIG. 6a and showing different shapes of protuberances;

FIG. 9 (FIGS. 9a, 9b, 9c) is a view similar to that of FIG. 3 but showing a further modification thereof;

FIGS. 10-12 are sectional views taken along the line A-B of FIG. 9a and showing various forms of protuberances; and FIG. 13 is a graph showing the deformation of thrust plates with and without protuberances under a compressive force.

Proceeding next to the drawings wherein like reference symbols indicate the same parts throughout the various views a specific embodiment and modifications of the present invention will be described in detail.

Figure 1:
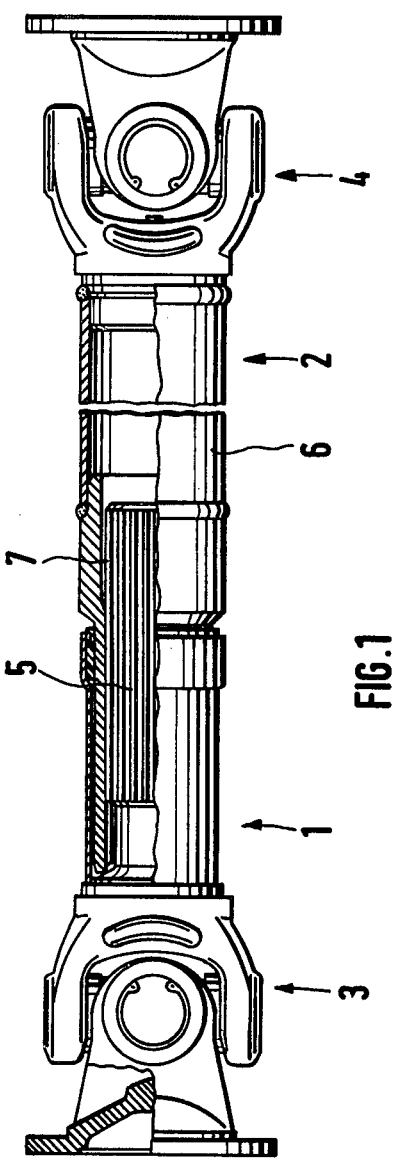
FIG. 1 is an elevational view of a cardan shaft, partially in section, having universal joints at both ends.

In FIG. 1 there is illustrated a cardan shaft for the transmission of power and comprising two coaxial shaft parts 1 and 2 having universal joints 3 and 4 at their outer ends. The shaft part 1 has an inner end 5 which is solid and is provided with longitudinal splines 7 which are slidably received in a correspondingly shaped tubular end 6 of the shaft part 2. The shaft parts 1 and 2 are thus telescopingly positioned with respect to each other and are nonrotatably but axially slidably interconnected.

Figure 2:
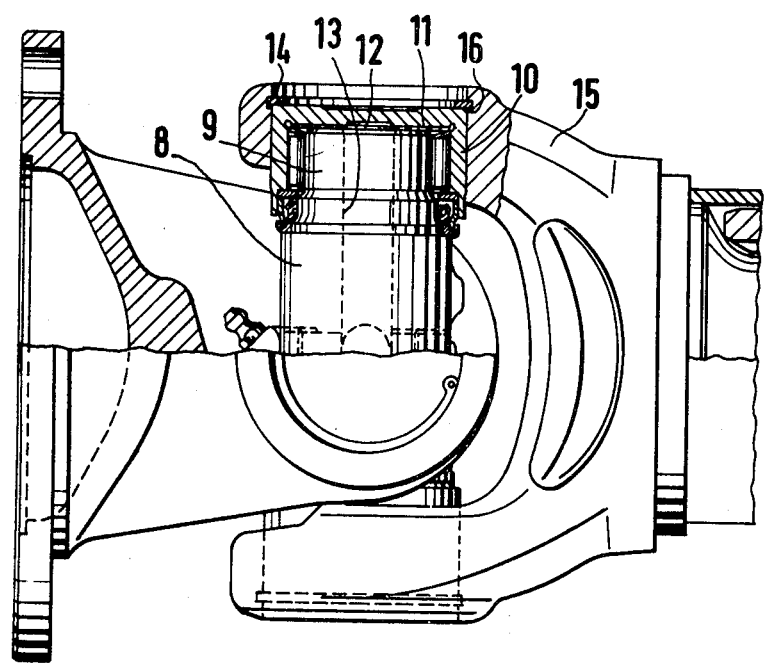
FIG. 2 is an elevational view in enlarged scale and partially in section of one of the universal joints on the cardan shaft in FIG. 1.

In FIG. 2 there is illustrated in greater detail one of the universal joints 3, 4 of FIG. 1 and the joint comprises a conventional trunnion 8 having a cup-shaped bearing bushing 10 positioned upon trunnion pin 9. A thrust plate 11 is positioned between the end face of the trunnion pin 9 and the bottom or end wall of the bushing 10. The thrust plate 11 has a central bore 12 through which lubricant is supplied to both sides of the thrust plate 11 by means of an axially extending passage 13 in the trunnion pin 9.

The terminal clearance for end play between the bottom wall of the bushing 10 and the thrust plate 11 or the end face of the trunnion pin 9 is adjusted to the desired magnitude by a spring ring 14 retained in an annular groove 16 formed in a bore of yoke arm 15 in which is received trunnion pin 9. The spring ring 14 thus axially positions the bushing 10. The spring ring 14 is one of a variety of spring rings of varying thicknesses which are utilized in the assembly of the universal joint in order to obtain the proper degree of clearance. The annular groove 16 has a width which is at least equal to the maximum thickness of the thickest of the inventory of spring rings 14. The tolerances of the individual components are such that in the assembled position of the universal joint as illustrated in FIG. 2, a portion of the annular ring 16 is always overlapped or blocked by the bushing 10 as may be in seen in FIG. 2.

Figure 4A:
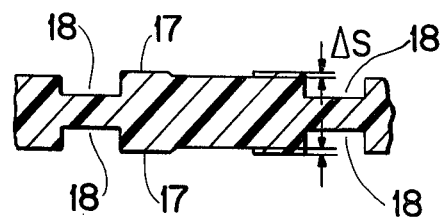
FIG. 4a is a sectional view similar to FIG. 4 but showing both sides of the thrust plate with grooves and raised portions.

The thrust plate 11 shown in FIGS. 3–5 comprises a relatively thin flat plate of a wear-resistant heat-stable synthetic plastic material, such as a polyamide. The thrust plate is provided with a central bore 12 and a plurality of lubricant grooves or channels 18 are positioned on both sides of the thrust plate to assure adequate lubrication thereof. A plurality of protuberances 17 are provided between the lubricant grooves 18 and in FIG. 3 are substantially radially positioned so as to form honeycomb structures. The protuberances 17 may be in the form of cams or raised circular areas as shown in FIGS. 6–8. In FIGS. 9–12, the protuberances 17 may be in the form of cam-ridges with various shaped cross-sections as can be seen in FIGS. 10–12.

The height of the protuberances or raised surface portion 17 must be at least equal to the thickness gradation of the spring rings 14 since otherwise it might not be possible to achieve a preloaded assembled universal joint.

In assembly of the joint, the open space of the annular groove 16 which is not overlapped by any portion of the bushing 10 is measured and the next larger thickness of spring ring 14 is fitted under preapplied load into the groove 16. As a result, the precise amount of desired terminal clearance or end play will be automatically obtained after the wearing away of the protuberances 17 on the thrust plate 11. Thus, the bushing 10 is assembled under a preapplied load accompanied with plastic deformation of the protuberances. The desired terminal clearance will thus be automatically established after the protuberances have been worn away. It is apparent that an advantage of this invention is that the thickness gradation between the various thicknesses of the spring rings may be comparatively rough since the desired clearance is not dependant on the precise thickness of the spring ring.

The thrust plates of the present invention can be readily manufactured in a simple injection mold which thus permits the use of various known wear-resistant synthetic plastic materials including polyamides.

The curves in FIG. 13 were obtained in compression tests wherein the force-deformation curves 19 and 20 were plotted for a thrust plate 11 with protuberances 17 (curve 19) and for a thrust plate without such protuberances (curve 20). It is also apparent from FIG. 13 that under an assembly load a greater deformation is obtained from the thrust plate having protuberances (curve 19) than with the thrust plate without protuberances (curve 20).

The thrust plates according to the present invention may also be used for heavy-duty cardan shafts having universal joints which are not normally provided with variable safety elements such as the above mentioned spring rings. When used with such heavy shafts, various thicknesses of thrust plate may be provided so that optimum and desired terminal clearance can be readily achieved using simple assembly methods.

The protuberances 17 which may be in the form of honeycomb formations, cams or cam-ridges may be provided on one or both sides of the thrust plate. The area occupied by these protuberances with respect to the total area of the thrust plate, except for the lubricant channels is such that deformation resistance under compression load will not exceed two-thirds of the corresponding deformation resistance value for the body of the thrust plate.

As a result of this relationship, the height of the protuberances will be reduced when the thrust plate is subjected to compression during assembly of the universal joint since the displaced material will flow away in the direction toward the free surface areas. The bushing which is assembled under a preapplied load creates a compression force along the contacting faces of the bushing and the thrust plate. The magnitude of this compression force is a product of the cross-section of the protuberances on the thrust plate in the deformation zone and the deformation resistance. In order to achieve precise terminal clearance or end play the total surface area of the protuberances is calculated by dividing preapplied load by deformation resistance. As a result, it is possible to determine the proportional size of the surface area which is to be raised in the form of bosses, protuberances or the like distributed over the total surface area of the thrust plate.

The proportionate area of the protuberances can also be ascertained on the basis that a thrust plate with protuberances has a deformation resistance value which is less by one-third than that of a similar thrust plate without such protuberances.

It will be understood that this invention is susceptible to modification in order to adapt it to different usages and conditions, and accordingly, it is desired to comprehend such modifications within this invention as may fall within the scope of appended claims.

What is claimed is:

1. A thrust plate for between an end face of a bearing pin of a trunnion in a universal joint and a bottom wall of a bushing on the bearing pin and comprising a wear-resistant heat-stable plastic material, there being lubricant grooves in a surface of said plate, and raised portions comprising a plurality of protuberances on said surface of said plate between said grooves, said raised portions being plastically deformable during assembly of the bushing on the bearing pin so that the desired end play is obtained between the bushing bottom wall and bearing pin end surface, said raised portions occupying an area such that deformation resistance under compression load will be less than a predetermined resistance value for said plate.

2. A thrust plate as claimed in claim 1 wherein the deformation resistance of said raised surface portions will be less than two-thirds of the resistance value for the plate.

3. A thrust plate as claimed in claim 4 wherein said protuberances comprise one of honeycombs, cams and cam-ridges.

4. A thrust plate as claimed in claim 1 wherein said plate comprises a disc.

5. A thrust plate as claimed in claim 1 wherein said raised surface portions are on both sides of said plate.

6. A thrust plate as claimed in claim 1 wherein said lubricant grooves are in both sides of said plate and said raised surface portions are on both sides of said plate.